Figure 1:
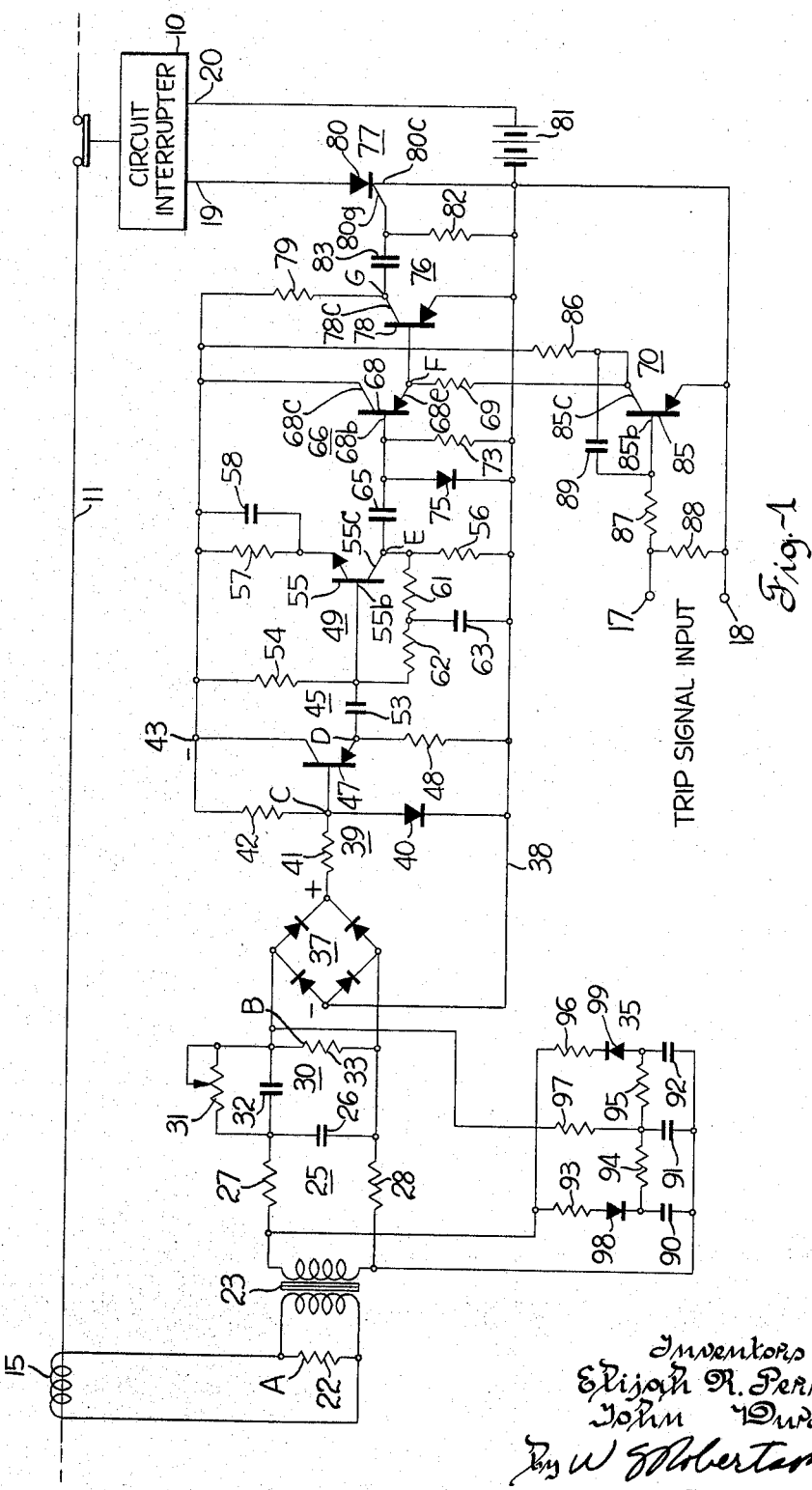

United States Patent Office 3,265,933
Patented August 9, 1966

3,265,933
CONTROL CIRCUIT FOR OPERATING CIRCUIT INTERRUPTER AT A ZERO CURRENT POINT IN SYSTEM WAVE FORM
Elijah R. Perry, Portland, and John Durecka, Beaverton, Oreg., assignors, by mesne assignments, to Allis-Chalmers Manufacturing Company, Milwaukee, Wis.
Filed Oct. 24, 1963, Ser. No. 318,727
9 Claims. (Cl. 317—11)

This invention relates generally to control circuits, more specifically to a circuit for operating a device such as a circuit interrupter at a predetermined point in a generally periodic wave form.

A significant application for the circuit of this invention is in signaling a circuit interrupter to separate its contacts just before or exactly at a zero crossing in the current wave form of the electrical system the circuit interrupter is connected in. Separating the contacts near current zero reduces contact wear and permits using low current rated interrupters in high current systems. One difficulty in achieving contact separation at a particular point in a wave form is that the mechanical delay in separating the contacts is a significant part of a half period of a 60 cycle per second wave form. Consequently, the circuit interrupter should be signalled ahead of a zero crossing by the time the circuit interrupter takes to change from its conducting state to its nonconducting state. One object of this invention is to provide a new and improved circuit that predicts a current zero and produces a signal to start operating the circuit interrupter far enough ahead of the zero crossing for the interrupter to reach its nonconducting condition at the expected zero crossing.

Circuit interrupters are frequently opened during a fault when the current wave form of an A.C. system may be nonperiodic and nonsinusoidal and may be offset on the zero axis by an exponentially decaying transient. In a three phase system, even with a pure sinusoidal wave form, opening the first phase causes the other two phases to become nonsinusoidal. In these situations it is difficult to predict a forthcoming zero crossing. One object of this invention is to provide a new and improved circuit that accurately predicts current zeros for a wide range of variations in the wave form.

The circuit of this invention receives a measure or analog of the current wave form of the associated electrical system, shifts the system current wave form ahead by the expected delay in operating the circuit interrupter, and signals the circuit interrupter at the zero in the phase shifted wave form. Because phase shifting circuits tend to distort a nonsinusoidal wave form, the circuit of this invention is especially constructed to preserve the line current wave form as much as possible. In one embodiment of the invention the control has a low frequency compensating network that restores parts of the wave form lost in the phase shifting network.

The drawing and the detailed description of the circuit will suggest specific problems in achieving the objects of the invention and the corresponding features and advantages of the invention.

The drawing

Figure 2:
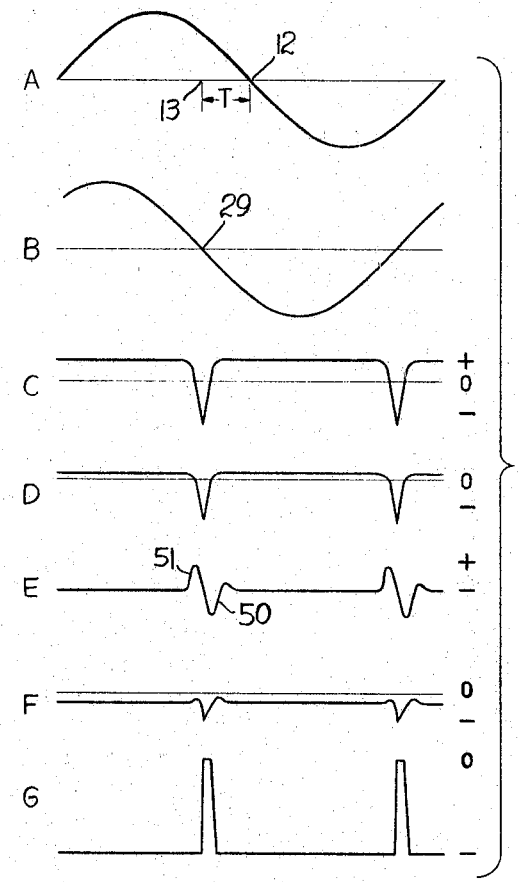

FIG. 1 is a schematic of an electrical system, a circuit interrupter, and a circuit for operating the circuit interrupter at a predetermined point on the wave form of the system; and FIG. 2 shows a series of wave forms associated with the electrical system and the circuit of FIG. 1.

The control

The control of FIG. 1 is intended to be used with a circuit interrupter 10 that is connected in an electrical line 11. A three phase electrical system would be provided with three independently operable circuit interrupters and three of the control circuits that FIG. 1 shows. Line 11 has a current wave form that FIG. 2A illustrates as a simple sinusoid. The general object of the control is to operate circuit interrupter 10 to have its contacts separated at a current zero 12 so that arcing will not occur. Circuit interrupter 10 has a delay T in separating its contacts; the control is constructed to signal circuit interrupter 10 at point 13 on the wave form of FIG. 2A which is appropriately ahead of the zero crossing 12.

The control includes coupling means comprising a current transformer 15 that is coupled to line 11 to provide a measure of the current wave form of FIG. 2A; the control also has a pair of control input terminals 17, 18 that are energized when it is intended to open circuit interrupter 10. When terminals 17, 18 are energized (e.g. by a manual input or by a fault sensing circuit) the circuit starts operating on the wave form of FIG. 2A to predict the line current zero crossing 12 and to energize its output terminals 19, 20 at the appropriate point 13 to open circuit interrupter 10. Output terminals 19, 20 are connected to energize a current (or voltage) sensitive component of circuit interrupter 10, for example a magnetic coil.

A resistor 22 is connected across the secondary winding of current transformer 15 and a voltage wave form corresponding to the line current wave form of FIG. 2A appears across resistor 22. Resistor 22 has a high conductance to provide a low burden on current transformer 15, and a voltage transformer 23 is connected to transform the voltage wave form across resistor 22 to an appropriately higher voltage to operate the next stage of the control. Preferably transformers 15 and 23 have sufficiently good low frequency response to transmit transients that may be somewhat lower in frequency than the frequency of the sinusoid of FIG. 2A.

The wave wave form of FIG. 2A may contain high frequency components, caused for example by arcing at a fault. (These components are not shown in FIG. 2A.) A low pass filter 25 with the appropriate frequency characteristic to suppress these components is connected between the secondary winding of voltage transformer 23 and the following stages stages of the circuit. Low pass filter 25 may comprise a capacitor 26 and two resistors 27, 28 connected for the wave form of FIG. 2A (approximately) to appear across capacitor 26 and for the high frequency components to appear predominately across the resistors 27, 28. Low pass filter 25 also retards the phase of the wave form, a phase change that a subsequent stage of the control components for.

FIG. 2B shows the wave form of FIG. 2A shifted ahead by the time delay T in opening circuit interrupter 10; the zero crossing 29 of FIG. 2B coincides in time with point 13 in the line current wave form where circuit interrupter 10 should be signaled to open. A phase shifter 30 is connected to receive the wave form across capacitor 26 (approximately FIG. 2A) and to produce the wave form of FIG. 2B. Phase shifter 30 comprises an array of resistances and reactances, illustrated as the parallel combination of a resistor 31 and a capacitor 32 connected in series with a resistor 33. The wave form of FIG. 2B appears across resistor 33. Preferably one of the components 31, 32, 33 of phase shifter 30 is made variable to adjust the phase shift of the circuit to the time delay of a particular circuit interrupter; as the drawing illustrates the phase shifter, resistor 31 is made variable.

Phase shifter 30 to some extent functions undesirably as a high pass filter and thereby tends to suppress low frequency components of the wave form. Phase shifter 30 is preferably designed to have good low frequency response; in the specific circuit of the drawing, resistor 31 helps the low frequency response. (The circuit preferably includes a low frequency compensator 35, described later, that restores low frequency components that are suppressed in phase shifter 30.)

The next stages of the control detect the zero crossing 29 in the wave form of FIG. 2B. Since the components of these stages respond differently to positive and negative polarities, the circuit is provided with a full wave rectifier 37 that produces a full wave rectified wave form corresponding to FIG. 2B except that it has a single polarity with voltage zeros where the wave form of FIG. 2B has zero crossings. The negative terminal (arbitrarily, for the transistor types illustrated) of rectifier 37 is connected to a point 38 of ground potential in the following stages.

The current wave form at the D.C. terminals of full wave rectifier 37 varies widely in magnitude, but the voltage zero sensing stages of the control have low voltage semiconductor components that are intended to respond only to a few volts in the valleys of the rectified wave form. A clipping circuit 39 is connected to receive the rectified wave form and to produce at its output the wave form of FIG. 2C in which the valleys are preserved but the peaks are clipped. Clipping circuit 39 comprises a diode 40 having its cathode connected to circuit ground, a resistor 41 connecting the anode terminal of diode 40 to the positive terminal of rectifier 37, and a resistor 42 connecting the anode terminal of diode 40 to a point 43 of negative potential. (Point 43 is maintained negative with respect to point 38 by a suitable voltage source not shown.) The wave form of FIG. 2C appears at the anode terminal of diode 40. Resistors 41 and 42 are given the appropriate values with respect to the potential of point 43 to cause diode 40 to turn off in the region of the valleys of the rectified wave form and to turn on when the wave form at the positive terminal of rectifier 37 is more than slightly positive. When diode 40 turns off, the full wave rectified wave form appears at the anode terminal; when diode 40 turns on, it maintains its anode terminal only slightly positive.

An amplifying stage 45 is connected to amplify the wave form of FIG. 2C. Stage 45 comprises a transistor 47 and a resistor 48 connected in a common collector configuration; it also includes the resistor 42 which provides base current for transistor 47. The output of stage 45, shown in FIG. 2D, appears across resistor 48; stage 45 further clips the wave form as FIG. 2D illustrates.

The next stage 49 receives the wave form of FIG. 2D and serves as a pulse producing means which produces a pulse 50 that has its leading edge substantially coincident with the rising slope of the valley in the rectified wave form of FIG. 2D and with the peak-going slope of the phase shifted wave form of FIG. 2B. (Following stage of the circuit separate pulse 50 from other parts of the wave form of FIG. 2E and amplify it sufficiently to actuate circuit interrupter 10.) Stage 49 comprises a capacitor 53 and a resistor 54 that are connected to differentiate the output of transistor 47. As transistor 47 turns off along the valley-going slope of the wave form of FIG. 2D, capacitor 53 charges in series with resistor 48 and the parallel combination of resistor 54 and the base-emitter circuit of transistor 55 (described later). As transistor 47 turns on along the rising slope of the wave form of FIG. 2D, capacitor 53 discharges in series with resistor 54 and the emitter collector circuit of transistor 47. As capacitor 53 charges and discharges, opposite polarity pulses generally similar to pulses 50, 51 in FIG. 2E appear across resistor 54.

A transistor 55 is connected to amplify the wave form across resistor 54 and to produce the wave form of FIG. 2E. Transistor 55 is connected in a common emitter configuration with a collector resistor 56 and the parallel combination of a resistor 57 and a capacitor 58. Resistor 57 and capacitor 58 are given appropriate values to bias transistor 55 to operate in its amplifying mode. A low pass filter comprising a T connection of resistors 61, 62 and a capacitor 63 is connected to feed back a measure of the wave form across resistor 56 (FIG. 2E) to base terminal 55b to help attenuate the response of the circuit to the low frequency components of the wave form of FIG. 2D.

A capacitor 65 couples the ouput of transistor 55 to the next stage 66 which amplifies pulse 50 (whose leading edge coincides with the zero crossing) and eliminates the preceding pulse 51. Stage 66 comprises a transistor 68 having its collector terminal 68c connected to point 43, a resistor 69 connecting emitter terminal 68e to ground 38 (through a switch 70 described later) and the parallel combination of a resistor 73 and a diode 75 connecting base terminal 68b to ground 38. The output of stage 66, shown in FIG. 2F, appears across resistor 69. (Since stage 66 is common emitter connected, FIG. 2F also represents the polarity and the approximate wave form of the input at base terminal 68b).

The rectifying action of the base-emitter junction of transistor 68 causes transistor 68 to amplify negative pulse 50 and to remain off in response to positive pulse 51. As transistors 55 and 68 turn on during the time of pulse 50, capacitor 65 charges with its terminal 68b at about ground potential and its terminal 55c negative; when transistor 55 turns off, resistor 56 connects negatively charged terminal 55c of capacitor 65 to ground 38 and tends to make its other terminal 68b positive. Diode 75 is connected in the appropriate polarity to turn on and discharge capacitor 65 fast enough to be ready for the next cycle.

Suitable amplifying stages 76 and 77 are connected to amplify the pulse of FIG. 2F to a suitable magnitude and duration to operate circuit interrupter 10. Stage 76 comprises a transistor 78 connected with a resistor 79 in a common emitter configuration. FIG. 2G shows the output wave form of stage 76. Stage 77 comprises a silicon controlled rectifier 80 that is connected with a source 81 (represented somewhat schematically as a battery) to provide an actuating signal at terminals 19, 20. A resistor 82 in stage 77 connects gate terminal 80g to cathode terminal 80c to help keep controlled rectifier 80 normally turned off. A capacitor 83 connects gate terminal 80g to collector terminal 78c to receive a positive-going pulse of FIG. 2G when transistor 78 turns on. (The series combination of resistors 69 and 86 has sufficiently high resistance to prevent turning on transistor 78 enough to seriously degrade the wave form of FIG. 2G.)

Switch 70, which was introduced earlier in this description, is connected to control the transmission of the current zero predicting signal from one stage to another; preferably switch 70 operates between the power stages 76, 77 and the zero predicting stages as FIG. 1 shows. Switch 70 comprises a transistor 85 and a resistor 86 connected in a common emitter configuration, an array of resistors 87 and 88 connecting base terminal 85b to receive the input at terminals 17 and 18, and a capacitor 89 connected to feed back a measure of the collector voltage to base terminal 85b. The emitter collector circuit of transistor 85 conducts in series with the emitter collector circuit of transistor 68 so that when transistor 85 is turned off, it isolates emitter terminal 68e from ground 38 and thereby keeps stage 66 from responding to the signal of FIG. 2E. The feedback connection of capacitor 89 causes transistor 85 to generate a ramp wave form at collector terminal 85c in response to a step change at input terminals 17 and 18. This feature helps to prevent transistor 85 from turning on in response to extraneous pulses at terminals 17 and 18 and it provides a convenient means to delay the operation of the control by giving the charging circuit of capacitor 89 the appropriate time constant. A delay can be useful to prevent the control from responding to an input signal at terminals 17, 18 until the transients in line 11 have died out somewhat and the system has achieved a more sinusoidal wave form. The circuit of the drawing can be adapted to have a delay that is negligibly short as compared with the half period of line 11.

As the circuit has been described so far, phase shifter 30 would to some extent attenuate the low frequency transients of line 11. This attenuation could cause the control to operate circuit interrupter 10 to open before or after the actual zero crossing 12. As has been explained already, phase shifter 30 is preferably designed for good low frequency response and the operation of the circuit can be delayed until the transient has substantially died out. Preferably, the low frequency compensating circuit 35 is provided to give the wave form of FIG. 2C the low frequency components lost in phase shifter 30.

Low frequency compensator 35 may comprise the array of capacitors 90, 91, 92 and resistors 93, 94, 95, 96, 97 and diodes 98, 99 shown in FIG. 1. On positive half cycles capacitor 90 charges in series with diode 98 and resistor 93. On the negative half cycle capacitor 92 charges oppositely in series with resistor 96 and diode 99. If line 11 has no D.C. component, capacitors 90 and 92 charge equally (for example); but if the line current wave form is offset by a D.C. component, one of the capacitors 90 or 92 charges more and the other less (depending on the polarity of the offset). Resistors 94 and 95 connect capacitor 91 to be charged according to the average difference in charge between capacitors 90 and 92. Resistor 97 connects one terminal of capacitor 91 to a terminal of rectifier 37 to combine the outputs of phase shifter 30 and low frequency compensator 35.

Other embodiments

The functional relationships of the components of FIG. 1 can be achieved by a variety of other suitable circuit modifications. For example, full wave rectifier 37, which functions to give both halves of the wave form of FIG. 2B the same polarity, can be replaced by providing a duplicate circuit in which each part operates on only one polarity of the FIG. 2B wave form.

In some situations it is advantageous to open circuit interrupter 10 only on a half cycle of a particular polarity. A half wave connection of rectifier 37 to eliminate the appropriate half cycle provides this operation.

Those skilled in the art will recognize other variations in the circuit within the spirit of the invention and the scope of the claims.

Having now particularly described and ascertained the nature of our said invention and the manner in which it is to be performed, we declare that what we claim is:

1. A control for signaling a circuit interrupter device in a system having a generally periodic system wave form to begin switching at a point in said system wave form ahead of a zero current point in order to effect switching at said zero current point, comprising:
   (a) coupling means adapted to be coupled to said system to provide an input signal representing an analog of said system wave form,
   (b) a phase shifter connected to receive said input signals and to produce a wave form that is shifted ahead of said system wave form so as to have a zero crossing which is approximately coincident with said first point,
   (c) a rectifier connected to receive said shifted wave form and to produce a rectified wave form having slope derivative discontinuities coincident with said first point,
   (d) a clipping circuit connected to receive said rectified wave form and to produce an amplified clipped wave form having its peaks clipped but its valleys preserved,
   (e) pulse producing means connected to receive the amplified clipped wave form and to produce a pulsed signal that has pulses of opposite polarity with the leading edge of one of said pulses being substantially coincident with the rising slope in the valley of said rectified wave form,
   (f) means connected to receive the pulsed signal to amplify it and attenuate low frequency components thereof,
   (g) means connected to receive the amplified attenuated pulsed signal and for amplifying said one pulse and for eliminating the other pulse of opposite polarity,
   (h) means connected to receive the amplified said one pulse and for providing a zero current predicting signal of suitable magnitude and duration,
   (i) switching means adapted to operate in response to said zero current predicting signal to initiate operation of said circuit interrupting device, and
   (j) trip signal input means to control transmission of said zero current predicting signal to said switching means.

2. A control according to claim 1 including a low pass filter connected to receive said input signal from said coupling means and for suppressing high frequency components therein prior to transmitting said input signal to said phase shifter.

3. A control according to claim 2 wherein said phase shifter tends to attenuate low frequency components of said input signal and including a low frequency compensator connected to said phase shifter to restore previously attenuated low ferquency components to said shifted wave form.

4. A control for signaling a circuit interrupter device in a system having a generally periodic system wave form to begin switching at a point in said system wave form ahead of a zero current point in order to effect switching at said zero current point, comprising:
   (a) coupling means adapted to be coupled to said system to provide an input signal representing an analog of said system wave form,
   (b) a phase shifter connected to receive said input signal and to produce a wave form that is shifted ahead of said system wave form so as to have a zero crossing which is approximately coincident with said first point,
   (c) a rectifier connected to receive said wave form and to produce a rectified wave form having slope derivative discontinuities coincident with said first point,
   (d) a clipping circuit connected to receive said rectified wave form and to produce a clipped wave form having its peaks clipped but its valleys preserved,
   (e) an amplifying stage connected to receive said clipped wave form and to amplify it,
   (f) pulse producing means connected to receive the amplified clipped wave form and to produce a pulsed signal that has pulses of opposite polarity with the leading edge of one of said pulses being substantially coincident with the rising slope in the valley of said rectified wave form,
   (g) means connected to receive the pulsed signal to amplify it and attenuate low frequency components thereof,
   (h) means connected to receive the amplifier attenuated pulsed signal and for amplifying said one of said pulses and for eliminating the other pulse of opposite polarity,
   (i) means connected to receive the amplified said one pulse and for providing a zero current predicting signal of suitable magnitude and duration,
   (j) switching means adapted to operate in response to said zero current predicting signal to initiate operation of said circuit interrupting device, and
   (k) trip signal input means to control transmission of said zero current predicting signal to said switching means.

5. A control according to claim 4 including a low pass filter connected to receive said input signal from said coupling means and for suppressing high frequency components therein prior to transmitting said input signal to said phase shifter.

6. A control according to claim 5 wherein said phase shifter tends to attenuate low frequency components of said input signal and including a low frequency compensator connected to said phase shifter to restore previously attenuated low frequency components to said shifted wave form.

7. A control for signaling a circuit interrupter device in a system having a generally periodic system wave form to begin switching at a point in said system wave form ahead of a zero current point in order to effect switching at said zero current point, comprising:

(a) coupling means adapted to be coupled to said system to provide a signal representing an analog of said system wave form, (b) a phase shifter connected to receive said input signal and to produce a wave form that is shifted ahead of said system wave form so as to have a zero crossing which is approximately coincident with said first point, (c) a rectifier connected to receive said shifted wave form and to produce a rectified wave form having slope derivative discontinuities coincident with said first point, (d) a clipping circuit connected to receive said rectified wave form and to produce a clipped wave form having its peaks clipped but its valleys preserved, said clipping circuit having a pair of output terminals, (e) a first stage comprising a first transistor connected in common collector configuration across said output terminals to receive said clipped wave form and to amplify it, (f) pulse producing means comprising a first capacitor connected to the output of said first transistor connected to receive the amplified clipped wave form and to produce a pulsed signal that has pulses of opposite polarity with the leading edge of one of said pulses being substantially coincident with the rising slope in the valley of said rectified wave form, (g) a second stage comprising a second transistor connected in common emitter configuration to receive the pulsed signal from said pulse producing means and to amplify it, said second stage including attenuating means comprising a low pass filter connected to feed back to the base of said second transistor for attenuating the response of said second stage to the low frequency components of the amplified signal from said first stage, (h) a third stage comprising a second capacitor coupling the output of said second transistor to a third transistor which is common emitter connected to receive the pulsed signal from said second amplifier means and for amplifying said one of said pulses and for eliminating the other pulse of opposite polarity, (i) a fourth stage comprising a third transistor connected in common emitter configuration to receive the amplified pulse from said third stage and for amplifying it to suitable magnitude and duration to provide a zero current predicting signal, (j) switching means adapted to operate in response to said zero current predicting signal to initiate operation of said circuit interrupting device, and (k) trip signal input means connected to said fourth stage and said switching means to control transmission of said zero current predicting signal to said switching means.

8. A control according to claim 7 including a low pass filter connected to receive said input signal from said coupling means and for suppressing high frequency components therein prior to transmitting said input signal to said phase shifter.

9. A control according to claim 8 wherein said phase shifter tends to attenuate low frequency components of said input signal and including a low frequency compensator connected to said phase shifter to restore previously attenuated low frequency components to said shifted wave form.

References Cited by the Examiner

UNITED STATES PATENTS

| | | |
|---|---|---|
| 1,967,849 | 7/1934 | Wideroe. |
| 1,967,850 | 7/1934 | Wideroe. |
| 2,531,443 | 11/1950 | Kesselring. |

STEPHEN W. CAPELLI, *Primary Examiner.*

SAMUEL BERNSTEIN, *Examiner.*

R. V. LUPO, *Assistant Examiner.*